United States Patent
Stevenson et al.

[11] 3,770,324
[45] Nov. 6, 1973

[54] MOTOR VEHICLE SECURITY SYSTEM AND SECURITY METHOD

[75] Inventors: Billy E. Stevenson, Huntington Beach; Thomas R. Rumsey, Inglewood, both of Calif.

[73] Assignee: Royal Industries, Inc., Pasadena, Calif.

[22] Filed: Sept. 20, 1971

[21] Appl. No.: 181,673

[52] U.S. Cl. .................................... 303/9, 303/89
[51] Int. Cl. .......................................... B60t 13/04
[58] Field of Search ................. 303/7, 9, 14, 89; 188/265, 106 F, 170; 137/384.8, 384.6, 384.4, 384.2; 92/63, 64; 70/371, 168

[56] References Cited
UNITED STATES PATENTS

| | | | |
|---|---|---|---|
| 3,240,537 | 3/1966 | Valentine | 303/89 X |
| 3,285,672 | 11/1966 | Avrea | 303/9 |
| 3,362,426 | 1/1968 | Polit et al. | 137/384.2 |
| 3,340,891 | 9/1967 | DeLaGarza | 137/384.2 |
| 1,394,860 | 10/1921 | Neville | 137/384.8 |
| 3,291,004 | 12/1966 | Stevenson et al. | 92/63 |
| 3,298,210 | 1/1967 | Nyborg | 70/371 |
| 3,674,321 | 4/1972 | Fontaine | 303/9 |
| 1,339,075 | 5/1920 | Toelle | 70/371 |

OTHER PUBLICATIONS
The New DD3 and 5D3 Safety Actuators, Bendix-Westinghouse Automotive Air Brake Company, 1963, p. 6, (page heading "Features and Advantages of DD3 and 5D3 Safety Actuators").

*Primary Examiner*—Milton Buchler
*Assistant Examiner*—Edward R. Kazenske
*Attorney*—Edward J. Da Rin

[57] ABSTRACT

A motor vehicle security system for trucks, trailers and the like equipped with conventional fluid operated braking assemblies. The security system comprises a manually operable valve for controlling the application of fluid under pressure to the braking assemblies to manually set the vehicle brakes. The valve is arranged with a mechanical, key-operated lock for controling and locking the valve in a selected position. When the valve is a "locked" position it allows the brakes to be set and the vehicle maintained in situ to prevent the unauthorized movement thereof. The brake assemblies are also secured and locked to prevent the manual operation thereof by means of a conventional lockout tool.

7 Claims, 10 Drawing Figures

KEY UNLOCKED - BRAKES OFF

— PRESSURIZED LINE -P
= DEPRESSURIZED LINE -P

KEY LOCKED - BRAKES ON

INVENTORS.
BILLY E. STEVENSON
THOMAS R. RUMSEY
BY
Christie, Parker & Hale
ATTORNEYS

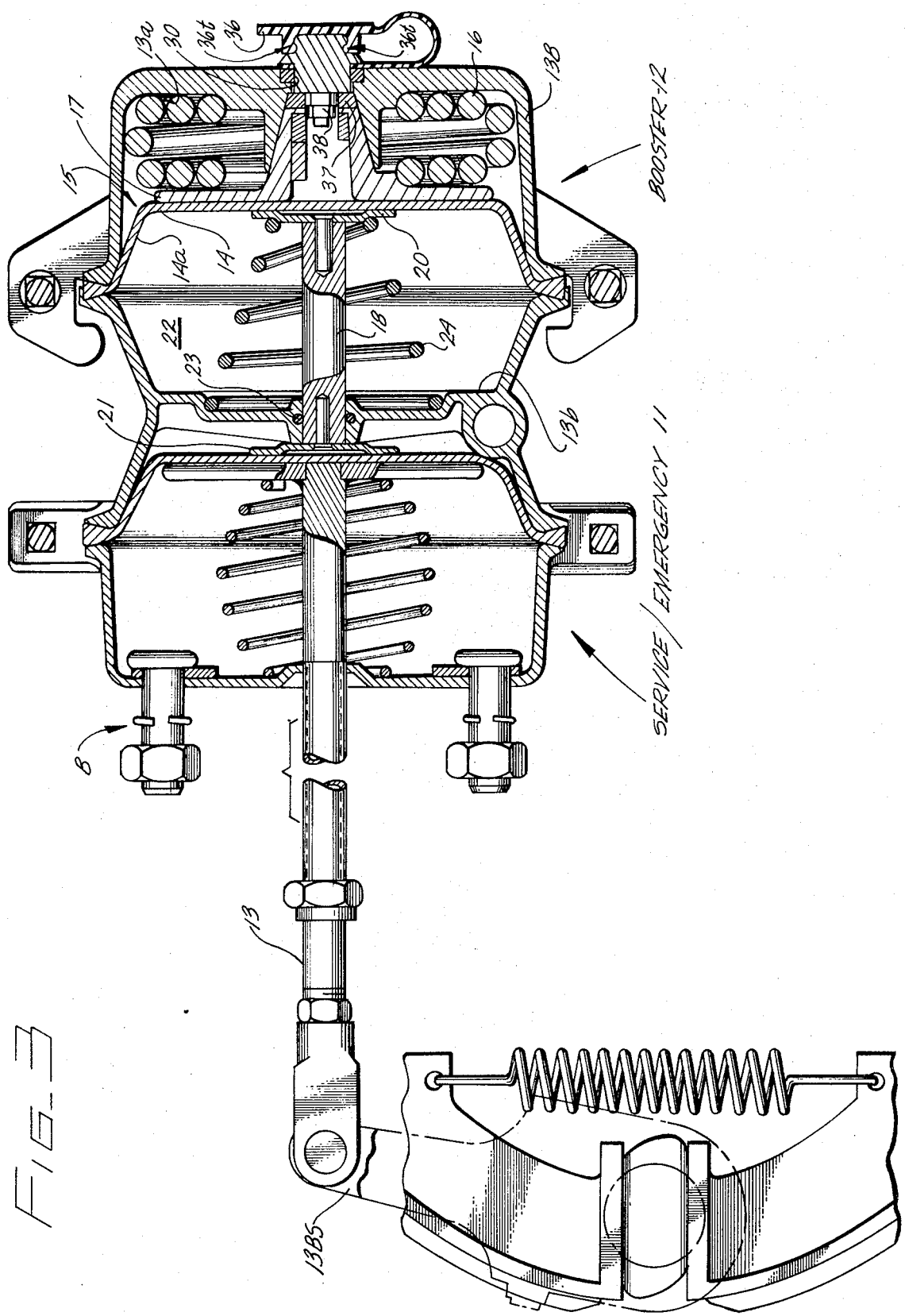

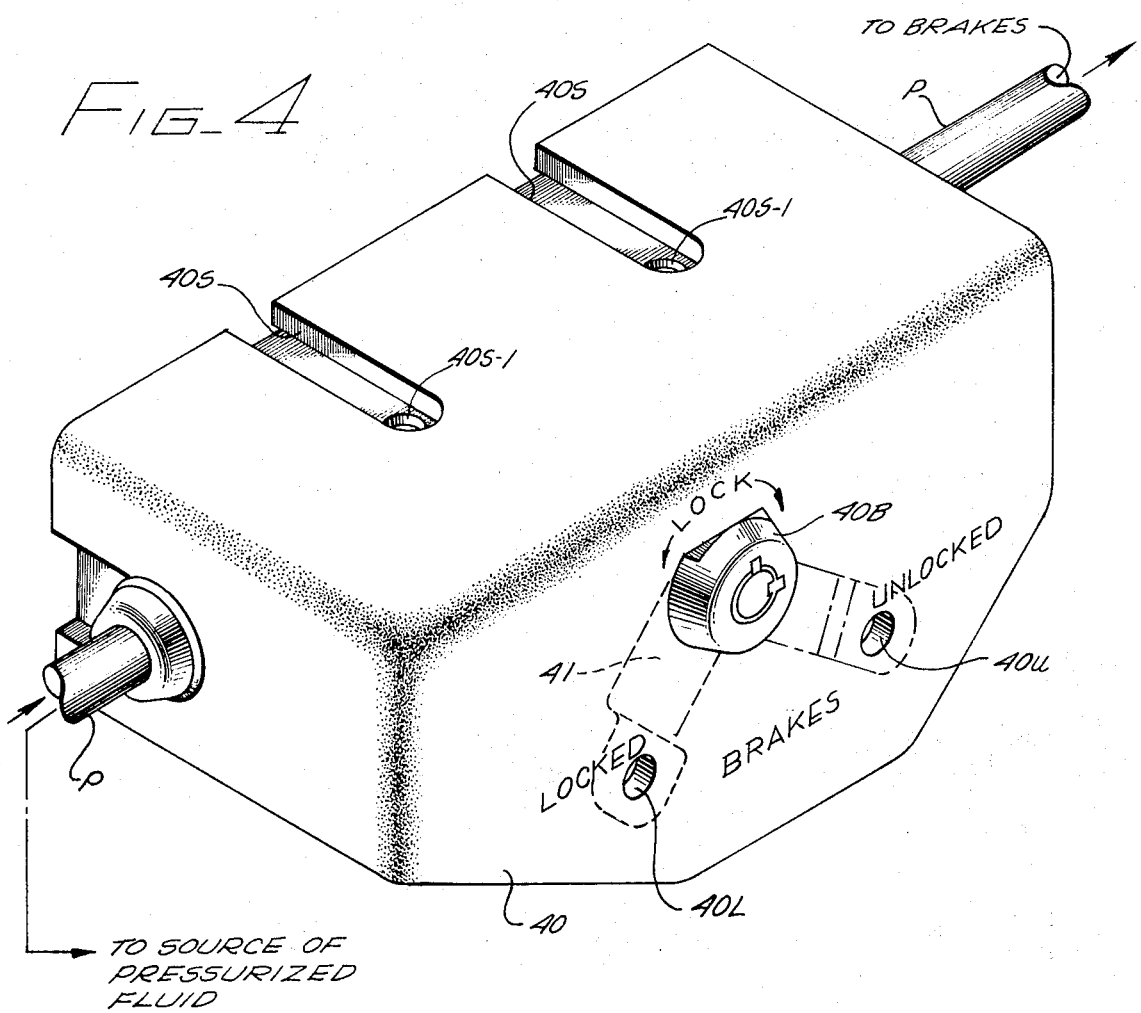
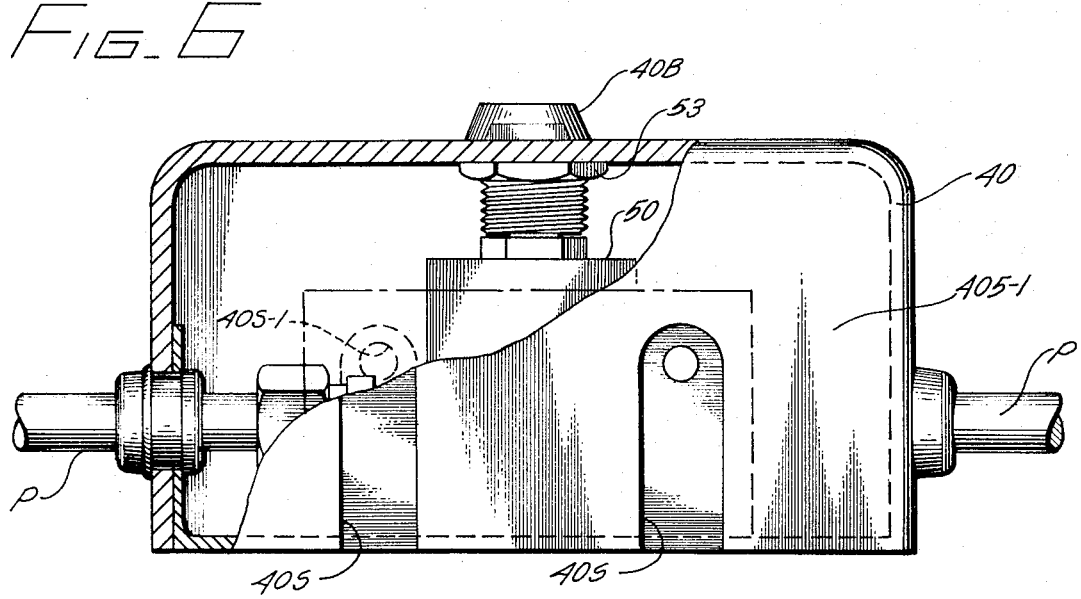

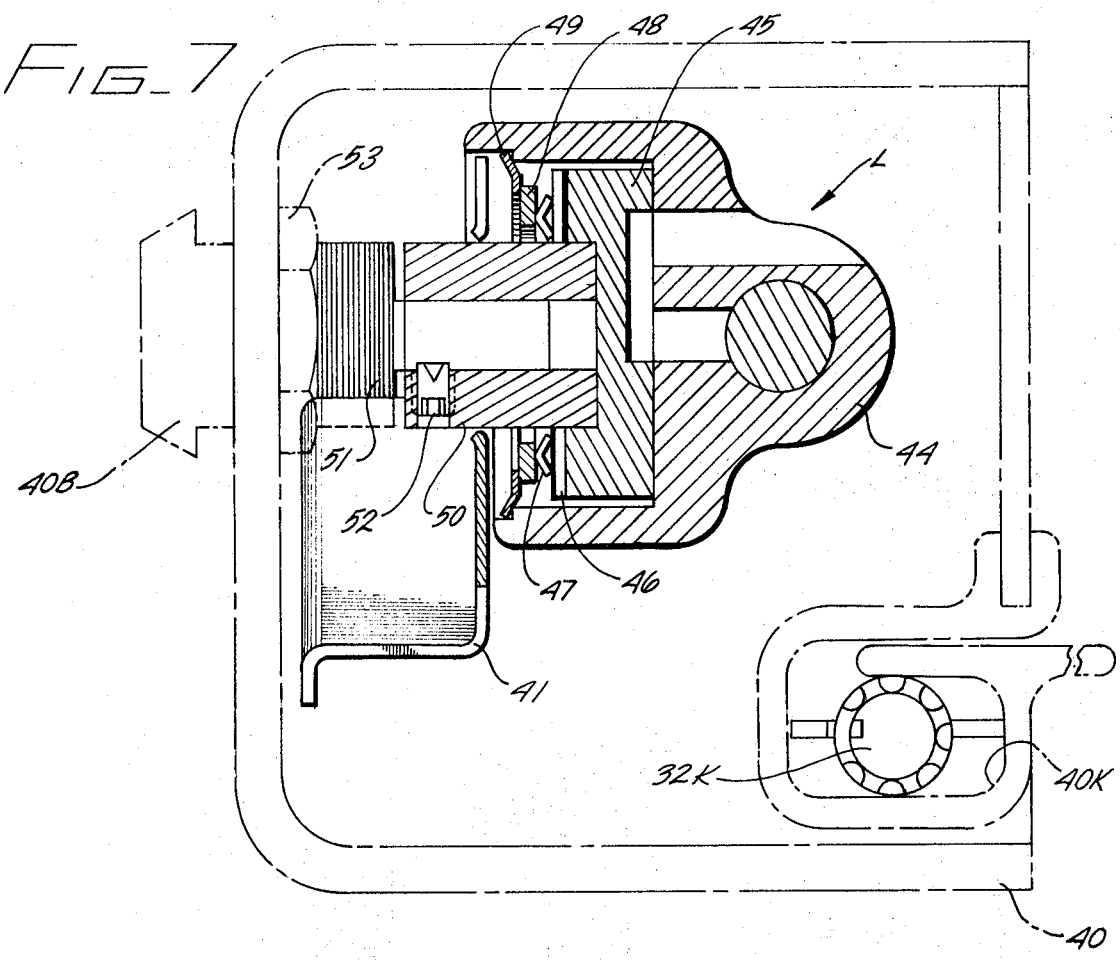
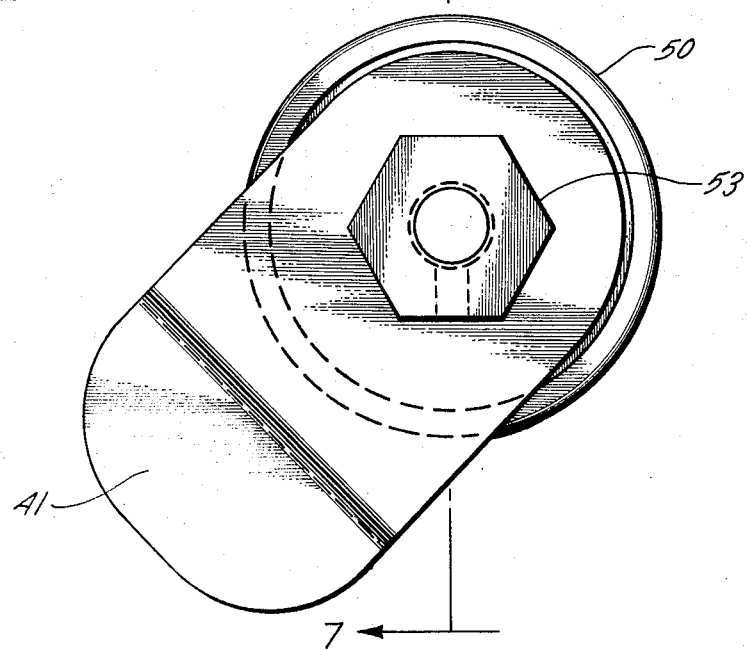

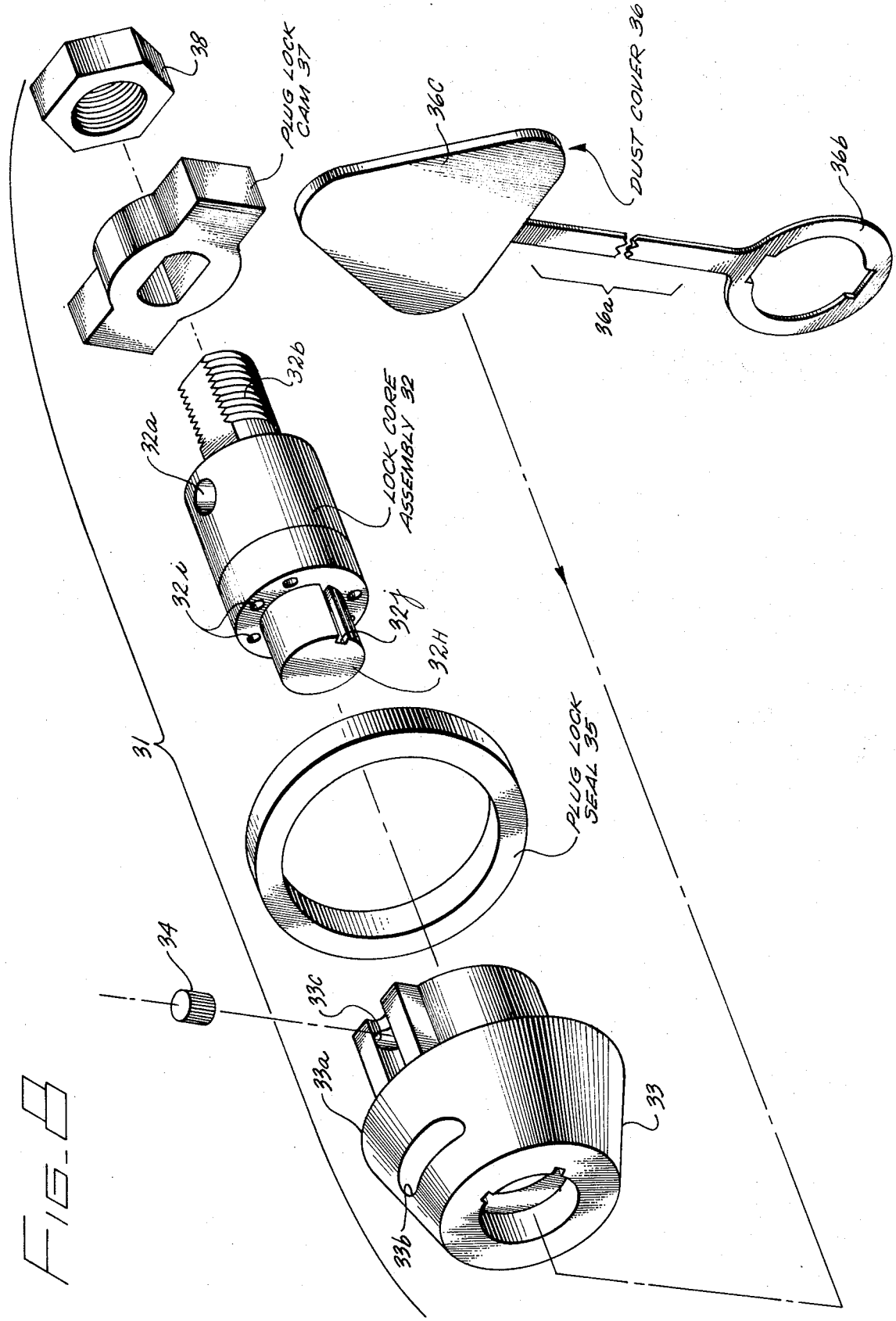

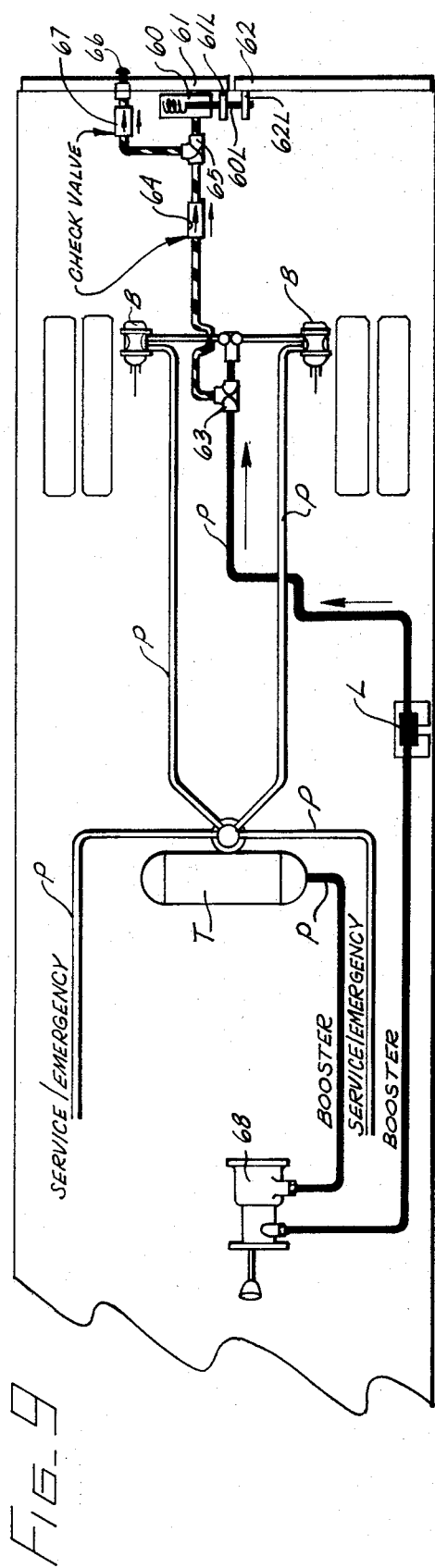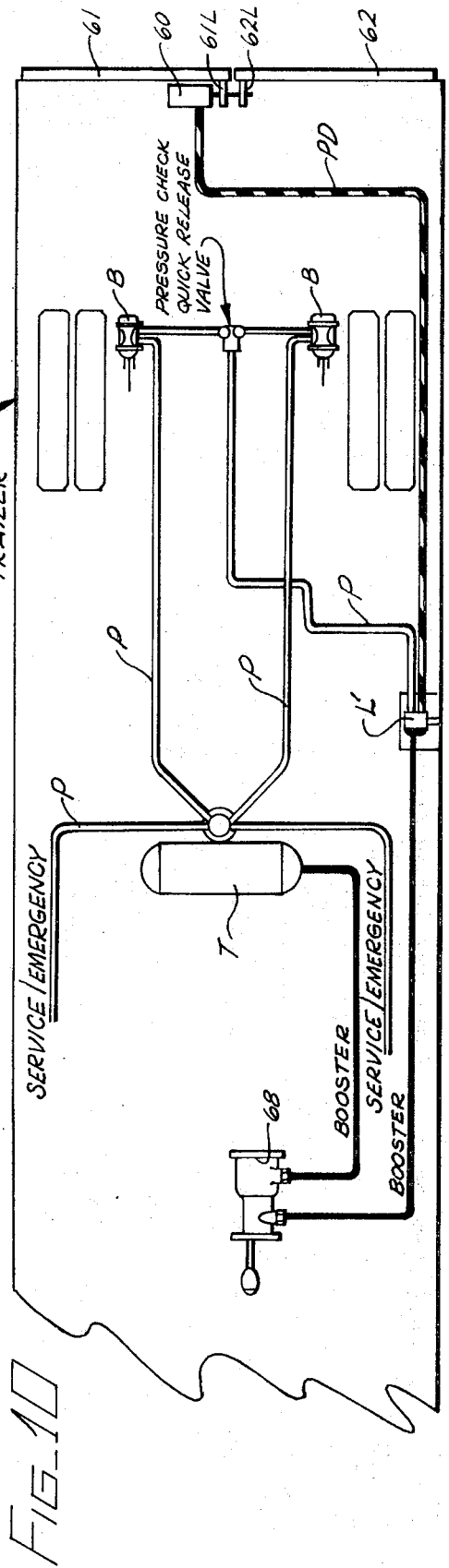

MOTOR VEHICLE SECURITY SYSTEM AND SECURITY METHOD

At the present time there is a need for some mechanism to prevent the theft of motor vehicles. This need is particularly apparent in commercial vehicles such as trucks, tractors, and trailers that are either individually or tandemly operated. These commercial vehicles, to a large extent, are provided with service and emergency braking means that are normally fluid operated. Some of these braking means are constructed in terms of emergency or booster spring brakes that automatically lock the vehicle wheels in the event of the loss of operating fluid, such as air under pressure at the brake assemblies. One such brake assembly is disclosed in U.S. Pat. No. 3,285,672 granted on Nov. 15, 1966.

The present invention advantageously utilizes the air or fluid operated braking mechanims that are normally provided with commercial vehicles such as trucks, trailers and tractors for the prevention of theft or improper operation of the motor vehicle. The present invention comprehends a method for securing motor vehicles to prevent the theft thereof of the type of motor vehicle comprising a tractor and at least one trailer coupled thereto having mechanically powered brake setting means operable from a fluid source for each of a plurality of wheels for setting the brakes. The vehicle may be locked by manually setting the brake operating means and then securing the set brake setting means. In this fashion a tractor, for example, may be decoupled from the trailer to leave the trailer in a locked and secured condition in situ thereby preventing its movement by unauthorized individuals.

The method specifically comprehends the operation of the brake setting means by coupling a manually operable control means for controlling the application of the fluid pressure to the braking means for setting the vehicle brakes. The method further includes signaling the locked or unlocked condition of the motor vehicle.

From an apparatus standpoint the present invention comprises a motor vehicle having a plurality of wheels and a source of pressurized air. The vehicle is provided with separate brake assemblies for each of the plurality of wheels and each are adapted to be activated to braking position by controlling the application of the pressurized air or fluid thereto. Pneumatic control means is coupled to the source of pressurized air for activating the braking assembly. The braking assembly for the motor vehicle includes conventional, mechanically powered alternate brake setting means coupled to the source of pressurized air to be operated therefrom and to be maintained in a deactivated condition in response to the application of pressurized air thereto and automatically activated to a brake setting position in response to the loss of the pressurized air. The system includes lockable valve means coupled in series relationship with the source of pressurized air and the mechanical brake setting means for controlling the application of the pressurized air thereto and thereby the "set" condition of the braking assembly. The lockable valve means is adapted to be manually operable and locked in a brake setting position. The lock for the valve may be a conventional mechanical key-operated lock adapted for operating the valve means.

These and other features of the present invention may be more fully appreciated when considered in the light of the following specification and drawings, in which:

FIG. 3 is a cross-sectional view of a conventional spring braking means adapted for use in the hydraulic system of FIGS. 1 and 2 in accordance with the present invention;

FIG. 4 is a perspective view of the lockable valve housing employed in the hydraulic system of the present invention and illustrated in FIGS. 1 and 2;

FIG. 5 is a left-hand end view of the valve detached from the valve housing of FIG. 4, illustrating the lock condition signaling element;

FIG. 6 is a top plan view, with portions broken away, of the housing illustrated in FIG. 4;

FIG. 7 is a sectional view of the detached valve of FIG. 5 taken along the line 7—7 and illustrating in dotted outline its position within the housing of FIG. 4;

FIG. 8 is an exploded view of the plug assembly employed for securing the brake illustrated in FIG. 3;

FIG. 9 is a schematic illustration of the hydraulic system of a motor vehicle security system embodying the present invention and including an arrangement for locking the doors of a motor vehicle; and FIG. 10 is a schematic illustration of another embodiment of the motor vehicle security system of the type illustrated in FIG. 9.

Figure 1:
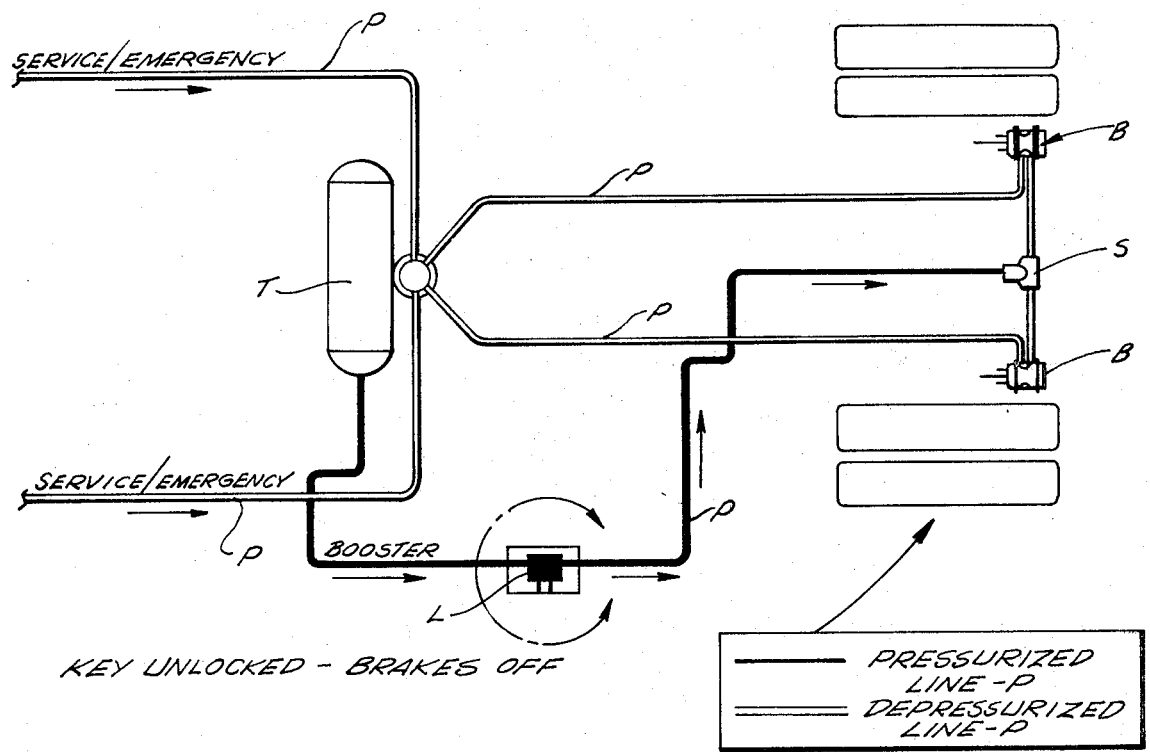
FIG. 1 is a schematic illustration of the hydraulic system of a motor vehicle security system in an unlocked condition and embodying the present invention.

Now referring to the drawings, the motor vehicle security system will be described as it may be employed with a conventional fluid operated braking means. One such conventional braking means that is particularly adaptable for use with the present invention is the spring braking means commercially available from the Anchorlok Division of Royal Industries, Inc. of Compton, California. The structure of such a spring operated braking means and the hydraulic system conventionally employed therewith is described in U.S. Pat. No. 3,285,672 granted on Nov. 15, 1966. The specific construction of a spring braking means adapted for use with the present invention is illustrated in FIG. 3. The spring braking means adaptable for use with the present invention merely requires some mechanically powered brake actuating means that is operable in response to the presence or absence of fluid pressure applied thereto for setting the conventional brakes of the motor vehicle. These braking systems normally are fluid operated and a conventional hydraulic circuit for such brakes is illustrated in FIG. 1 in combination with the lockable valve means for embodying the security system of the present invention.

Figure 2:
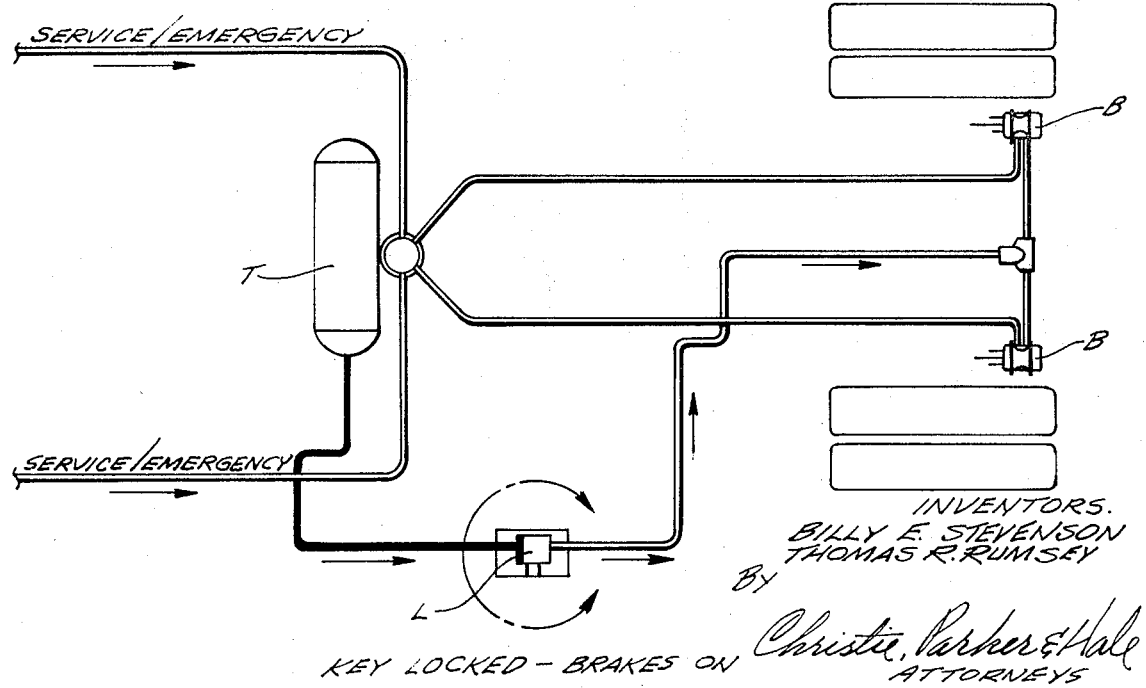
FIG. 2 is a schematic illustration of the motor vehicle security system embodying the present invention and illustrating the hydraulic system thereof in a locked condition.

In FIGS. 1 and 2 there is illustrated a pair of wheels arranged on opposite sides of a motor vehicle such as may be found in a conventional truck or trailer. Each pair of wheels is provided with braking means B coupled to the source of fluid pressure illustrated as the tank T. The fluid under pressure is supplied to the brakes B through suitable fluid conduits or piping P. The piping P is illustrated for both service/emergency and booster assemblies of the brakes B illustrated in FIG. 3. As illustrated in FIG. 1, lockable valve means L is arranged in serial relationship with an emergency conduit P coupled between the tank T and a T for coupling the tank S to each of the booster portions of the brakes B. The lockable valve means L may be a three position valve for controlling the application of fluid under pressure or air to the booster portions of the brakes B. As illustrated in FIG. 1 the valve L is in an unlocked condition and therefore the fluid under pressure from the tank T is applied to the booster portions of the brakes B to maintain them in a deactuated condition or the brakes OFF. When the valve L is manually operated to its braking operating position the lines P are depressurized as illustrated in FIG. 2. In this condition, the fluid under pressure is removed from the booster sections of the brakes B allowing the mechanically operated brakes to be applied. It will be seen from reviewing FIG. 2 that under these conditions the fluid under pressure from the tank T is blocked at the valve L thereby causing the bleeding or removal of the air at the boosters of the brakes B and the actuation of the brakes and preventing the movement of the vehicle.

Prior to examining the security system in more detail, at this point a brief description of the mechanical brake setting means B will facilitate understanding of the invention. The conventional brake setting means B as adapted for the present invention is illustrated in FIG. 3 in terms of a service/emergency brake actuating assembly having a booster assembly arranged in piggyback fashion therewith.

FIG. 3 illustrates in cross section a brake apparatus B that comprises a service/emergency braking unit 11 connected with a booster unit 12 in the conventional "piggyback" fashion. It will be appreciated by those skilled in the art that the brake apparatus B illustrated in FIG. 3 is typical of the brake apparatus applied to a pair of wheels of a truck or tractor, or tractor hauled trailer and that at least a pair of the wheels will carry the braking apparatus B. For this purpose, the braking apparatus B is provided with a braking rod 13 for connection to the conventional brake shoe setting crank arm 13BS. It should be understood that the operation of the braking rod 13 effects the corresponding operation of the brake shoe setting arm 13BS as is conventional in the prior art braking apparatus. The booster unit 12 of the braking apparatus B is illustrated in FIG. 3 under the condition where the fluid under pressure is fully applied to the booster unit 12 as it is arranged in normal operation for parking purposes and emergency operation.

The construction of the booster unit 12 is of conventional construction and such booster units are commercially available from the Anchorlok Division of Royal Industries, Inc. of Compton, California. Briefly, the booster unit 12 comprises a housing 13B including a booster diaphragm 14 mounted across the housing to define a pair of chambers on opposite sides thereof. A chamber 15 is defined on the right side of the booster diaphragm 14, as illustrated in FIG. 3, defines a chamber for caging a conventional booster compression spring 16 therein. The compression spring 16 is mounted against a floating bearing plate 17 mounted adjacent the right hand side of the diaphragm 14 and the outer end of the housing 13B. In the illustrated caged or fully compressed condition of the spring 16, the spring is maintained between the bearing plate 17 and the adjacent wall 13a of the housing 13B. It will also be noted that the compression spring 16 positions and holds the floating bearing plate 17 against the face of the booster diaphragm 14. The opposite side of the booster diaphragm 14 mounts a push rod 18 having push plates 20 and 21 mounted to opposite ends thereof. The push rod 18 is maintained within the chamber 22 which may be considered as the fluid or air chamber for the booster unit 12. The chamber 22 is defined by means of the fluid exposed surface of the diaphragm 14 further identified by the reference character 14a, the opposite face of the chamber being defined by the housing 13B proper and more particularly the wall identified by the reference numberal 13b. The push rod 18 is slidably mounted through the wall 13b of the housing in a fluid tight fashion to maintain the chamber 22 properly pressurized. For this purpose an "O" ring 23 is mounted within the wall 13b. A spring 24 is mounted within the air chamber 22 between the push rod plate 20 and the wall 13b of the housing 13B to maintain a minimum amount of pressure on the booster diaphragm 14 and thereby the compresion spring 16.

It should be recognized that with the fluid chamber 22 fully pressurized that the push rod 18 will be arranged as illustrated in FIG. 3. Upon the complete failure of the fluid pressure to the fluid chamber 22 or when the pressure within the chamber falls below a predetermined pressure the compression spring 16 will be allowed to expand against the booster diaphragm 14 for moving the diaphragm to the left thereby operating the push rod 18. The push rod 18, in turn, will be effective for operating the brake operating rod 13 through the service/emergency unit 11 and thereby the brake shoe setting arms 13 BS sets the brake shoes in the usual fashion. The above-described booster unit 12 is of conventional construction and the booster unit, per se, does not form a portion of the present invention.

The booster unit 12 is arranged in the conventional "Piggyback" fashion with the service/emergency unit 11 whereby the push rod plate 21 for the push rod 18 is mounted within the service/emergency unit 11 proper to allow for the "piggyback" or tandem operation of the service/emergency unit 11 and the booster unit 12.

To permit assembly and disassembly as well as servicing the booster apparatus it is conventional to provide a lockout tool to place the spring 16 in a caged or compressed condition after it has been released to actuate the brakes. For the purpose of the present invention, then, it will be noted that an aperture is normally provided at the booster exposed end of the housing 13B for receiving such a lock out tool and which aperture must be secured to prevent unauthorized operation of the booster 12. The lockout tool may be carried on the side of the housing for the brake B in the manner disclosed in U.S. Pat. No. 3,291,004 granted on Dec. 13, 1966. This aperture is illustrated in FIG. 3 as the aperture 30. To prevent the unauthorized operation of the booster 12, this opening is secured by a plug lock assembly 31 illustrated in FIG. 3 in its secured position in the aperture 30. The same elements of plug lock assembly 31 are illustrated in an exploded form in FIG. 8. It is particularly apparent from reviewing FIG. 8 that a conventional, mechanical lock core assembly 32 is employed with the plug lock body 33 secured thereto by means of a lock pin 34. A plug lock seal 35 is mounted in abutting relationship with the plug lock body 33 at the shoulder 33A defined inwardly of the outer end thereof and mounted around the lock core assembly 32 forward of the opening 33C that receives the lock pin 34 and extends into the locking aperture 32a for the core assembly 32. As is evident from FIG. 3, the outer end of the plug lock body 33 is provided with a flexible dust cover 36 that has a dependent arm 36A mounting an apertured locking element 36B that is secured to the lock body 33 at the shoulder 33a between the shoulder and the plug lock seal 35. The opposite end of the arm 36a carries the triangular, flat cover 36C which is provided with a pair of locking tabs 36t that secures to the corresponding locking apertures 33b provided for the lock body 33 as best appreciated by examining FIG. 3.

The lock core assembly 32 is of conventional construction and is a commercially available key-operated lock. The assembly 32 receives a key 33K of the type illustrated in FIG. 7, at the key receiving end of the core assembly 32H. The operating end of the key 32K coacts with the apertures 32i and 32j arranged in the core assembly end 32h. With the placement of the key 32k into the body 33 and assembly 32 the lock is rotatable between a locked and an unlocked position in a conventional fashion. The right hand end of the lock core assembly 32 is threaded at the section 32B and receives a plug lock cam 37 secured to the assembly 32 by means of a nut 38. This assembly is held in place in the aperture 30 and with the rotation of the key to the locked position, aperture 30 is secured to prevent the unauthorized manual operation of the spring brake or booster assembly 12.

Now referring to FIGS. 4–7, the structure and operation of the rotatable valve L will be described. The rotatable valve assembly L is provided with a housing 40 which protects the valve from tampering and damage and also houses the fittings for the conduits P so that they can be disassembled only by unlocking with the key 32K. The pipes P are coupled between the source of pressurized fluid or tank T, the valve L and the brakes B as described in conjunction with FIGS. 1 and 2. The housing 40 may be mounted anywhere on the motor vehicle and when employed with a trailer the assembly may be mounted on the side or end of the trailer and secured to the trailer body by means of fasteners or the like. For this purpose the housing 40, as illustrated in FIG. 4, includes a pair of slots 40S having fastener securing openings 40 S-1 for receiving a fastener for securing the housing 40 to the motor vehicle. The rotatable valve L is mounted in the housing 40 with a lock of the same type as described in conjunction with FIGS. 3 and 8 and mounted for manually controlling the valve and locking it in the selected position. The body portion of the lock extends outwardly from the housing 40 to receive the key 32K for operating the lock core assembly. The lock body is identified by the reference numeral 40B and is arranged to extend from the outer face of the housing 40 with a pair of signaling apertures 40L and 40U arranged on opposite sides thereof. The aperture 40L is provided for viewing the indicator signaling the locked condition of the brakes when the lock has been operated to this position, while the aperture 40U allows the indicator to be viewed during the unlocked condition of the brakes as illustrated in FIG. 4. The valve L housed within the housing 40 includes a signaling arm illustrated in dotted outline and identified by the reference numeral 41 that is swingable between the two apertures 40L and 40U with the operation of the lock between the two positions so that it either appears at the "locked" aperture 40L or the "unlocked" aperture 40U for signaling the corresponding condition of the lock.

The valve L employed for the purposes of the present invention is a three-way valve which is arranged in serial relationship with the piping or conduits for conveying and blocking the fluid under pressure or air from the tanks T to the brakes B. In the blocked position the valve L provides a passage for conveying the fluid from the brakes B to the atmosphere to "bleed" the booster assemblies. This valve may be any conventional three-way valve for effecting this function. The valve L is illustrated in section within the housing 40 in FIG. 7 along with the lock assembly. As illustrated in FIG. 7, the valve will be seen to comprise a valve body 44 mounting a valve disc 45. The outer wall of the valve disc 45 mounts a wave washer 46 secured thereto by means of a retaining ring 47. The retaining ring 47 is arranged with a washer 48 and a second retaining ring 49. These latter mentioned elements surround the valve stem 50 which receives the conventional lock core assembly 51 and is secured thereto by means of the set screw 52 secured to the valve stem 50 by means of a suitable aperture as illustrated. The lock core body is secured to the inner wall of the housing 40 so as to have its key receiving portion 40B extending from the outer wall of the housing 40 as described hereinabove. The valve stem 50 also mounts the indicator 41 so that it will be rotated in response to the operation of the lock and valve stem 50 for setting of the valve L in its selected position and signaling the position. The lock core assembly 51 is secured in position by means of a fastener or nut 53 secured adjacent the inner wall of the housing 40 as illustrated in FIG. 7.

It should also be noted that the housing 40 is constructed and defined with a key holding receptacle 40K. The receptacle 40K is illustrated in the lower right hand portion of FIG. 7 and is utilized to store the key 32K. The same key 32K is employed for operating all of the locks on any one security system. This arrangement allows the plug lock assembly to be unlocked and removed from the brakes B to allow the manual operation of the brakes and also to allow the interchangeability of the trailers when the system of the present invention is utilized with tractor-trailer combinations.

Now referring to FIG. 9, the hydraulic system for a motor vehcile for locking the wheels of a motor vehicle as described hereinabove will be described as the system may be modified to include means for locking the doors of a motor vehicle. As illustrated in FIG. 9 the hydraulic system is applied to the tractor of a tractor-trailer combination for locking the doors of the trailer by means of the hydraulic system. It will be understood that the system may be applicable for locking the doors of any motor vehicle whether it is the tractor, the trailer or the tractor-trailer combination. In addition, the hydraulic system may be constructed and defined to control the locking of the doors along with the locking of the motor vehicle wheels simultaneously or independently through separate hydraulic circuits.

The general arrangment of the hydraulic system illustrated in FIG. 9 is the same as that illustrated in conjunction with FIGS. 1 and 2. The lockable valve means L of the previously disclosed embodiment is illustrated in the booster line to the brakes B. The lockable valve L is employed to control the application of the pressurized air from the tank T to the brakes B as well as to the locking means 60 provided for the doors 61 and 62 for the trailer schematically illustrated. The locking means 60 is pneumatically operated and in this instance is mounted inside the trailer for the purpose of locking the trailer doors. The locking means 60 is characterized as being pneumatically operated to control the application of a locking shaft 60L for locking and unlocking the doors 61 and 62. It may be found convenient to utilize the mechanically operated braking structures or the spring brakes B for the controllable locking means 60. The shaft 60L for the locking means 60 is adapted to be slidably received in locking ears 61L and 62L mounted on the interior of the respective doors 61 and 62. It will be recognized that if the locking means 60 is a spring brake that it would require a tremendous amount of force to pry the doors 61 and 62 loose when locked.

The locking means 60 is arranged in hydraulic circuit relationship with the lockable valve L. For this purpose a T connection 63 is coupled into the piping upstream of the T connection for coupling the tank T to each of the booster portions of the brakes B. The T connection 63 is cou;ed to the locking means 60 through a circuit including a one-way check valve 64 and a T connection 65. One port of the T connection 65 is connected to the check valve 64 while the other port is connected to the locking means 60. The third port for the T connection 65 is connected to a manual pressure releasing valve 66 through a one-way check valve 67. The manual pressure release valve 66 may be adapted to be operated from the exterior of the motor vehicle or in this instance the trailer for controlling the application of the pressurized air to the locking means 60. It will be recognized that the illustrated relationship of the check valves 64 and 67 is to block off the auxiliary piping for the locking means 60 to the conventional piping system for operating the brakes B as described hereinabove.

The system of FIG. 9 is also adapted to allow the motor vehicle operator to control the application of both the brakes and the locking means 60 through his normal driving position within the cab of the tractor. For this purpose, a conventional dash control valve 68 is provided. One port of the dash control valve 68 is connected to the piping identified as the booster piping extending between the tank T and a port of the dash control valve 68. The other port of the valve 68 is connected to one port of the controllable lockable valve means L and, as in the previous embodiment, the outlet piping from the valve L is connected to the T connection 63.

From the above description, the operation of the hydraulic system for locking the doors of a motor vehicle or a trailer should be evident. The control of the brakes B is the same as in the previous embodiment. It will also be recognized that with the provision of the control valve 68 that it can be used to remove the pressurized air from the brakes B through the operation thereof when the valve L is in an unlocked condition. This operation will also set the locking means 60 in a locked condition. The locking of the valve L is effective for setting the brakes B and the locking means 60 in a locking condition at the same time. In this embodiment the shaft 60L for the locking means 60 is operative when the air under pressure is released from the chamber to allow the shaft 60L to lock the doors 61 and 62. The application of pressurized air to the locking means 60 will withdraw 61L shaft 60L from the locking ears 61L and 62L for unlocking the door. This may be effected by operation of the lockable valve L to the unlocked position or the manual pressure release valve 66. It will be understood that the manual pressure release valve is effective for applying the pressurized air and bleeding out the pressurized air from the means 60. With this arrangement, then, with the system applied to a trailer or a tractor-trailer combination the wheels and the doors of the trailer may be locked simultaneously. This may be accomplished while the tractor and the trailer are coupled together and after the trailer is positioned in its desired location, the doors and the wheels may be locked in this position and location and the tractor decoupled from the trailer.

Now referring to FIG. 10, another embodiment of the hydraulic system of the type discussed in combination with FIG. 9 will be described. In this embodiment the trailer doors 61 and 62 are also adapted to be locked by means of a pneumatically operated means 60 in the same fashion as described in the embodiment of FIG. 9. The hydraulic system in this instance has been simplified from that of FIG. 9 through the provision of a single fluid conduit identified as the conduit PD that is coupled between the locking means 60 and a lockable valve L'. In this instance, the lockable valve L' is substantially identical to that described hereinabove except for an extra port provided on the valve L' for receiving the one end of the conduit PD. In this fashion, the lockable valve L' will be connected in an independent hydraulic circuit to the locking means 60 from the conduit P coupled to the brakes B and both are operable through the valve L' in the same general fashion as described in combination with FIG. 9. For this purpose the dash control valve 68 is also employed for controlling the application of the pressurized air to the element L' and the brakes B and element 60. The operation of the lockable valve element L', then, will control the locking and unlocking of the locking element 60 with respect to the doors of the motor vehicle or the trailer. It should also be recognized that in accordance with the previous description the positions of the lockable valve elements L and L' as embodied in the system of FIGS. 9 and 10 will also signal the locked and unlocked condition of the doors and the brakes of the motor vehicle, tractor or trailer depending upon the application of the system of the present invention. What is claimed is:

1. A motor vehicle security system for a motor vehicle comprising a motor vehicle having a plurality of wheels, a source of pressurized air, separate braking assemblies for each of a plurality of wheels each adapted to be activated to a braking position, pneumatic control means coupled to the source of pressurized air for controllably activating the braking assemblies, the braking assemblies including mechanically powered alternate brake setting means coupled to the source of pressurized air and maintained in a de-actuated brake setting condition in response to the application of pressurized air thereto and automatically activated to a brake setting position in response to the loss of pressurized air below a predetermined level, and a lockable three way valve means coupled in series with the source of pressurized air and the mechanical brake setting means for controlling the application of pressurized air thereto and thereby the braking condition of the braking assembly, the mechanically powered brake setting means being a spring powered brake setting means constructed and defined to allow manual resetting of the spring powered brake setting means at said brake means, said spring powered brake setting means including means for preventing the manual resetting of the spring powered brake setting means at said brake means to prevent unauthorized operation of the braking assemblies when the lockable valve means is in the locked brake setting position, the lockable valve means being manually operable to a locked condition for producing a brake setting operation and thereby render said control system inoperative and manually operated to an unlocked condition for allowing the controllable and automatic setting of the brakes without interference with the normal operation of the control system therefor.

2. A motor vehicle security system as defined in claim 1 wherein the three-way valve means has ports for conveying the pressurized air to the spring powered braking means and having a port for de-pressurizing said braking means.

3. A motor vehicle security system as defined in claim 2 including means for indicating the operative position of the lockable valve means.

4. A motor vehicle security system as defined in claim 1 wherein the lockable valve means is a key operated and controlled valve.

5. A motor vehicle security system as defined in claim 4 wherein the valve means is a combination of a key operated mechanical lock and a valve.

6. A motor vehicle security system as defined in claim 4 wherein the valve means is adapted for carrying a key.

7. A motor vehicle security system as defined in claim 1 wherein said means for preventing the unauthorized manual operation of the braking assemblies at said brake means comprises key operated, removable locking means secured to the mechanically powered brake setting means.

* * * * *

PO-1050
(5/69)

UNITED STATES PATENT OFFICE
CERTIFICATE OF CORRECTION

Patent No. 3,770,324        Dated November 6, 1973

Inventor(s) Billy E. Stevenson and Thomas R. Rumsey

It is certified that error appears in the above-identified patent and that said Letters Patent are hereby corrected as shown below:

| | |
|---|---|
| Column 1, line 17 | reads "mechanims" and should read --mechanisms-- |
| Column 4, line 9 | reads "numberal" and should read --numeral-- |
| Column 5, line 12 | reads "key 33K" and should read --key 32K-- |
| Column 7, line 20 | reads "cou;ed" and should read --coupled-- |
| Column 7, line 62 | reads "shaft 60L" and should read --shaft 61L-- |
| Column 7, line 64 | reads "withdraw 61L" and should read --withdraw the-- |

Signed and sealed this 7th day of May 1974.

(SEAL)
Attest:

EDWARD M. FLETCHER, JR.
Attesting Officer

C. MARSHALL DANN
Commissioner of Patents